United States Patent [19]

Kling

[11] 4,073,516

[45] Feb. 14, 1978

[54] WIND DRIVEN POWER PLANT

[76] Inventor: Alberto Kling, Am Hugel 14, D-8136 Percha, Germany

[21] Appl. No.: 584,354

[22] Filed: June 6, 1975

[51] Int. Cl.$^2$ .............................................. F03D 9/00
[52] U.S. Cl. ....................................... 290/55; 244/33; 416/121; 416/85; 416/126
[58] Field of Search ............... 244/33, 5; 416/196, 416/205, 126, 128, 121, 85; 415/7; 290/44, 55; 73/170

[56] References Cited

U.S. PATENT DOCUMENTS

| 2,153,523 | 4/1939 | Roberts et al. | 290/44 |
| 2,384,893 | 9/1945 | Crook | 244/5 |
| 2,433,344 | 12/1947 | Crosby | 290/44 |
| 3,229,517 | 1/1966 | Smith | 73/170 |

FOREIGN PATENT DOCUMENTS

| 466,172 | 11/1950 | Italy | 244/33 |
| 5,067 | 6/1920 | Netherlands. | |
| 18,158 of | 1907 | United Kingdom | 416/126 |
| 11,193 of | 1910 | United Kingdom | 244/33 |
| 489,139 | 7/1938 | United Kingdom | 290/44 |

*Primary Examiner*—Robert K. Schaefer
*Assistant Examiner*—John W. Redman
*Attorney, Agent, or Firm*—Stevens, Davis, Miller & Mosher

[57] ABSTRACT

A tethered wind-driven floating power plant which includes a support body carrying at least one rotor assembly, a current generator coupled to the rotor and alignment assembly for aligning the rotor to face into the wind, a ground anchor and at least one captivating stay connecting the floating power plant to the anchor. The support body is hollow and gas-filled to carry its own weight as well as the weight of the rotor assembly, current generator and alignment assembly. The support body is connected to the captivating stay through a joint connection having three degrees of freedom. The rotors are gimbal-mounted, at a variable relative position with respect to the support body but in fixed positions relative to one another.

11 Claims, 18 Drawing Figures

WIND DRIVEN POWER PLANT

This invention relates to a wind-driven power plant of the type having a rotor assembly comprising at least one rotor coupled to a current generator, a support means supporting said rotor assembly and current generator, and a means for aligning said rotor assembly in the wind direction.

Hitherto known wind-driven power plants of the above-captioned type comprise support means designed as a framework structure for supporting the rotor or rotors and the current generator coupled therewith above the ground. Such framework structures are stationary and otherwise of limited height, since on exceeding a relatively small height the construction costs will be prohibitively high. Thus in these known wind-driven power plants the rotors are supported at a relatively small height above the ground surface, so that they are impinged on by very low-altitude winds only. The force, direction, and incidence of low-altitude winds, however, is to a large degree dependent on geographic environment factors and furthermore subject to considerable variations. The known wind-driven power plants are thus unable to utilize the high-altitude-winds prevailing at greater distances above ground and being significantly more steady as regards their intensity and direction than low-altitude winds. It is thus an object of the invention to provide a wind-driven power plant of the above-captioned type having a simple construction and enabling the wind energy of high-altitude winds at great distances above ground to be utilized and converted in an economical manner.

According to the invention this object is attained by said support means comprising at least one aerostatic suspension body, such as a gas-filled hollow body, carrying its own weight as well as the weight of the remaining assemblies connected thereto, such as the rotor assembly, current generator, and alignment means, said suspension body being connected through at least one captivating stay to an anchorage means on the ground or to a floating body at sea.

Thus in the wind-driven power plant according to the invention the support means is no longer constructed as a framework rigidly connected to the ground surface, but rather as an aerostatically suspended device adapted to be brought to a desired height above ground and to be maintained at such height by means of at least one captivating stay through which it is connected to an anchorage means on the ground or to a floating body, such as a floating body. The aerostatically suspended support device elevates the rotor, or rotors, to altitudes whereat the prevailing high-altitude winds are subject to relatively small variations as regards their intensity and direction. The energy generated at such height may for instance be transported to ground through a current conductor. In this case it is possible to employ one captivating stay simultaneously as a power cable. It is also possible, for instance, to consume the energy generated at high altitudes immediately at such altitudes, e.g. for energizing a transmitter also carried by said suspension body, or for energizing optical display devices, such as luminous letters carried by the suspension body. It may for instance also be possible to employ the energy generated at high altitudes immediately for performing environment-threatening processes in devices also carried by the suspension body. The waste materials accrueing from such processes may possibly be dissipated in the atmosphere at safe altitudes. The aerostatically suspended wind-driven power plants according to the invention offer the further advantage that they do not require expensive transport systems, such as rail or road transport, for transporting them to the site of erection, and do not either require to be erected at such site, but that they may be completely assembled at the factory, from where they may be floated to the site of installation while carrying their own weight. Therefore the wind-driven power plants according to the invention are particularly suited for being employed in undeveloped areas such as in desert areas and large forest areas having no transport lines. They may for instance also be employed by supplying power to floating or ground-supported drilling rigs at sea. Advantageously the wind-driven power plant according to the invention is designed such that the rotor assembly consists of at least one pair of coaxially supported, counterrotating rotors with moment of momentum compensation. In such an embodiment there occur no precession effects on a change of attitude of the rotating rotors, since the precession effects of the counterrotating rotors are mutually compensating. This enables alignment of the rotors in the prevailing wind direction to be effected rapidly and in a simple manner by suitably controlling the attitude of the suspension body or by means of adjustment devices acting on the rotors, such as control flaps attached to a structure carried by the suspension body and supporting the rotors.

The wind-driven power plant according to the invention may employ rotors of widely varying design and operation, for instance axial-flow propellers, tangential-flow vane-type impellers or Flettner-rotors in the form of rotating cylinders operating on the Magnus principle.

A particularly advantageous combination of rotors and current generators is achieved by employing pairs of koaxial and coplanar, counterrotating rotors, each of which carries along its periphery a plurality of poles cooperating with opposite poles provided at a periphery of the respective other rotor. In this manner the counterrotating rotors form the relatively rotatable parts of a current generator. This construction permits a high current energy generation to be achieved at low weight in the aerodynamically optimal manner.

A favourable embodiment of the wind-driven power plant according to the invention is also achieved by the suspension body being coupled to the captivating stay through a connecting joint having three degrees of freedom, e.g. a gimbal joint connection. A connection of this type permits the suspension body to be readily adjusted to any desired attitude without the counteraction of outer forces. In designing the joint connection between the suspension body and the captivating stay, or stays, the position of the center of gravity will of course have to be taken into account. With an elongated suspension body, for instance, a connection forward of the center of gravity may be prefereable, or likewise, a connection at the center of gravity. If the captivating stay itself has only little torsional rigidity, so that it ensures rotatability about its own axis, it may be possible to dispense with a specially designed joint having three degrees of freedom and to achieve the same effect by connecting the suspension body to the captivating stay through a tilting joint extending transversely of the axis of the captivating stay.

A further embodiment of the wind-driven power plant according to the invention may be achieved by maintaining the suspension body at its position by means of several captivating stays. In this manner it is possible to maintain the suspension body substantially stationary above a certain position on the ground. It is also possible to captivate a suspension body by means of several captivating stays in such a manner that it is always kept horizontal in a parallel guiding system and may be moved to varying altitudes.

A favourable embodiment of the wind-driven power plant according to the invention is also achieved by providing the suspension body with at least one device for alignment in and maintaining a determined attitude, for instance an elevator, a rudder, or control flaps. Such alignment devices enable the suspension body to be maintained at a determined attitude. This may be brought about for instance by means of control surfaces urging the suspension body towards the desired attitude employing the effect of the wind flowing therealong. Such control surfaces may be coupled to control devices so as to be continuously adjustable. It is also possible, however, to adjust control surfaces to fixed positions and to thereby exert forces on the suspension body for adjusting the attitude thereof. The rudders or control flaps may be attached to the suspension body itself or may be affixed to an extension structure fastened to the suspension body, so as to obtain a greater lever effect in this manner.

An advantageous embodiment of a wind-driven power plant according to the invention may also be achieved by the rotor, or rotors, being disposed at a fixed position relative to the suspension body or bodies. In this embodiment a change of attitude of the suspension body results also in a change of attitude of the rotor assembly relative to the wind direction. With this embodiment it is thus possible to control the attitude of the rotor assembly relative to the wind direction by controlling the attitude of the suspension body. Furthermore this construction results in a compact structure.

A further advantageous embodiment of the wind-driven power plant according to the invention is achieved by the rotors being disposed in fixed positions relative to each other, and being connected to the suspension body, or bodies, for instance through a gimbal joint, so as to permit their position relative thereto to be varied. In this embodiment the attitude of the rotor assembly may be controlled independently of that of the suspension body. In this case it may be possible to dispense with any position or attitude control of the suspension body, which may be designed in this case as a simple balloon. In such an embodiment the attitude control for the rotor assembly is to be effected by means of a control device acting directly on the rotor assembly.

An advantageous development of the above described embodiment of the wind-driven power plant according to the invention is achieved by the rotor, or rotors, being coupled to a device for aligning it, or them, respectively, in the wind direction and for maintaining a desired attitude, such device comprising, for instance, elevators, rudders, control flaps, vanes or the like. Such control devices may be affixed for instance to carrier structures supporting the rotor assembly and themselves connected to the suspension body or bodies. The control devices, such as rudders and/or elevators may be designed as pivotable flaps for aligning the rotor assembly in the wind direction by the employ of wind forces in response to a control means.

In the wind-driven power plant according to the invention the design of the suspension body, or bodies, may take a large variety of forms. As already noted, the suspension body may in some cases be designed as a simple balloon having no rigid envelope but retaining its shape only under the influence of the interior pressure of the gas filling and the pressure of the surrounding atmosphere. The connection of a rotor assembly to a balloon of this type may for instance be accomplished by means of a net-like wrapping applied over the balloon and carrying at its lower edge a connecting joint to which the rotor assembly is attached. The connecting joint may be fastened to the balloon in the same manner as the passenger basket to a conventional gas balloon. It is also possible, however, to provide the suspension body with a rigid shape, for instance by means of a rigid envelope, and to design such shape in accordance with aerodynamic requirements. Thus the suspension body may have an elongate drop shape similar to that of conventional airships. It may also be advantageous, however, to design the suspension body in the shape of a disc or mushroom head. The suspension body may be comprised of a plurality of hollow chambers. It may also be designed as a skeleton structure with a number of hollow chambers disposed separately in such skeleton structure. It is of course also possible to couple several suspension bodies to each other, for instance by means of connection struts or a connection structure.

A favourable embodiment of a suspension body of a wind-driven power plant according to the invention may be achieved by designing a suspension body as a hub body disposed coaxially with the rotor or rotors. In such an embodiment the suspension body may be disposed at an aerodynamically particularly favourable position at the axial center of a rotor, or of two coplanar and coaxial rotors, with the rotational support, i.e. the bearings of the rotor, or rotors, respectively, and possibly also the current generator and control means being disposed within the suspension body.

A further advantageous embodiment may be achieved by designing a suspension body as an annular jacket concentrically surrounding the rotor or rotors. Such an embodiment may result in a considerable improvement of the efficiency of the rotors by correspondingly guiding the air flow. Such an annular jacket suspension body may of course be employed in combination with a centrally disposed hub-shaped suspension body.

A further advantageous embodiment of the wind-driven power plant according to the invention may be achieved by designing a suspension body as an aerodynamic lift surface or wing. In this embodiment it is possible with the captive suspension body to utilize an additional aerodynamic lift generated by the wind flow therealong and to supplement the aerostatic lift forces in this manner. Such a wing-shaped suspension body by being captive acts similar to a kite attached to a captivating line. By suitably forming the wing-shaped suspension body and possibly by providing it with control flaps it is also possible to achieve a highly accurate attitude control of the suspension body.

With reference to the drawings, embodiments of the invention will be described hereinafter. In the drawings.

Figures 1, 2:
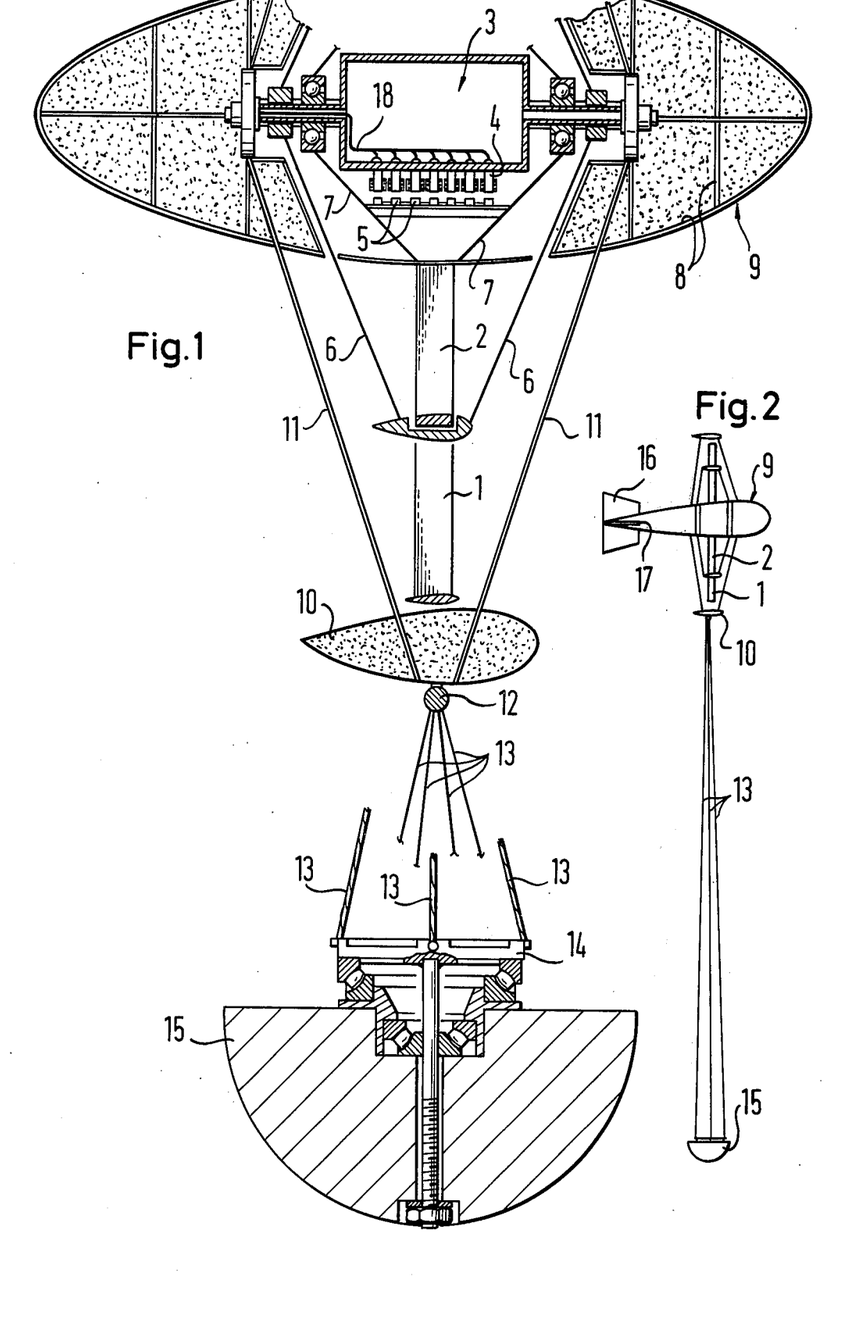
FIG. 1 shows a longitudinal section of a first embodiment of a wind-driven power plant according to the invention.
FIG. 2 shows an overall elevational view of the embodiment of FIG. 1 at a further diminished scale.

FIGS. 1 and 2 of the drawings show a first embodiment of a wind-driven power plant. In this embodiment two coaxial and coplanar rotors 1 and 2 are counterrotatably supported on a shaft. The shaft has an enlarged central portion designed as a hollow drum supporting along its periphery a plurality of poles 4 carrying electric conductor windings thereon. Each of said two rotors 1 and 2 consists of an annular rotor blade assembly connected to struts 6 and 7, respectively, said struts extending inwardly of the respective rotor blade assembly along both sides of the main rotor plane. The struts 6 of the outer rotor 1 straddle the inner rotor 2 and have their inner ends directly affixed to the shaft. The struts 7 of the inner rotor 2 have their ends connected to bearing sleeves rotatably supported on the shaft. This construction of the rotors results in a very low weight in combination with high form stability. At its inner periphery the inner rotor 2 carries a plurality of permanent magnet poles 5 cooperating with the poles 4 of the drum, themselves connected to the outer rotor 1 for rotation therewith. By virtue of this arrangement the two counterrotating rotors 1 and 2 form the relatively rotatably parts of a current generator 3. The moments of momentum of the counterrotating rotors 1 and 2 are compensated, i.e. the gyroscopic effects thereof are mutually compensating, so that even on a change of attitude of the entire system, there will be no gyroscopic moments acting on the end portions of the shaft. The shaft commonly supporting the rotors 1 and 2 has its ends rotatably supported in a skeleton structure 8 of a suspension body 9. This suspension body 9 has an aerodynamically faired elongate shape with circular cross section and is designed such as to form a hub body at the center of the rotors 1 and 2. In its interior the suspension body 9 has a number of cavities filled with a lighter-than-air gas, e.g. helium. The outer periphery of the outer rotor 1 is surrounded at a small radial distance by an annular suspension body 10 formed as a gas-filled hollow body. This annular suspension body 10 is rigidly connected to the skeleton structure 8 of the suspension body 9 by means of struts 11 straddling the pair of rotors 1, 2. The suspension bodies 9 and 10 together form an aerostatic suspension system, the lift of which carries the weight of the suspension bodies themselves as well as that of the rotors, the current generator, and further components. In addition, the suspension body 10 functions as a flow guide for producing a "tunnel flow" of the wind through the two rotors. In this manner the efficiency of the two rotors is greatly improved. On the other hand the rotors themselves are surrounded at their inner and outer peripheries by closed hoops acting to guide the air flow and thus to improve the efficiency of the rotors. At the lower portion of the outer periphery of the suspension body 10 there is attached a triaxial universal joint 12 having affixed thereto a group of four captivating stays 13. The lower ends of the captivating stays are connected to a swivel joint 14 for rotation about a third (upstanding) axis, said swivel joint being in turn affixed to a heavy anchoring body 15. This anchoring body 15, which in the shown embodiment is of half-spherical shape, may be considered as a heavy weight resting on a base plate and forming an anchorage of the entire system to the ground, such anchorage permitting movement in all directions. The weight of the body 15 is such that it may not be lifted off the ground by the suspension bodies 9 and 10. Because of the large scale of FIG. 1, the captivating stays 13 are shown interrupted. FIG. 2 shows the entire installation again at a smaller scale. As further shown in FIG. 2, the hub-shaped central suspension body 9 may have control surfaces 16, 17 attached to the rear end thereof to act as rudders and elevators, respectively, or as stabilizers. These control surfaces permit the suspension body system 9, 10 and the rotors 1 and 2 connected thereto to be maintained at an attitude corresponding to the prevailing wind direction, with the wind itself being utilized for aligning the rotors in the wind direction. The joints 12 and 14 in turn permit the attitude control of the suspension bodies and the rotors to be accomplished irrespective of the direction of the pull exerted by the captivating stays 13.

Figure 3:
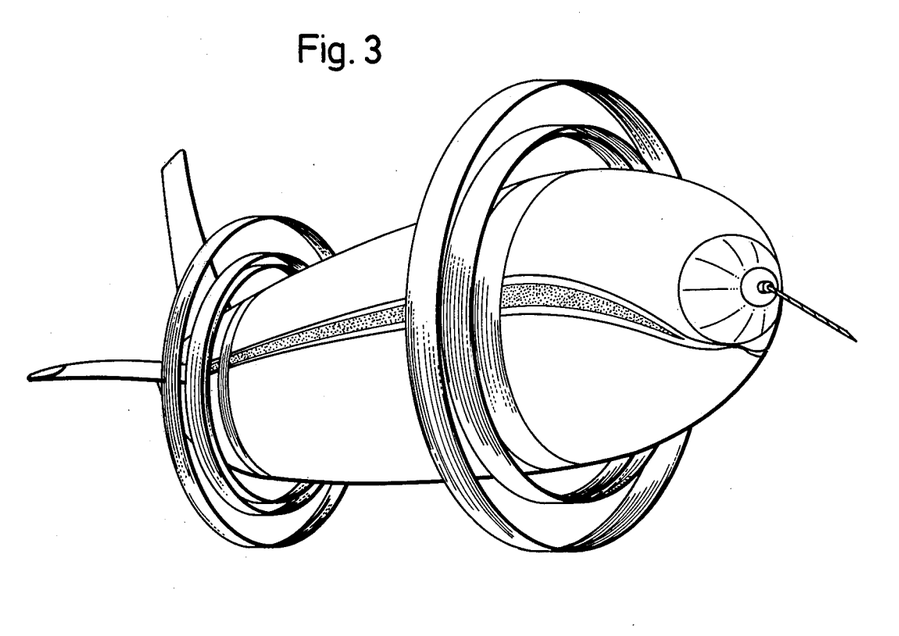
FIG. 3 shows a partially schematic perspective view of a wind-driven power plant according to a second embodiment.

The current generated in the current generator 3 may be conducted to the ground surface possibly via slip ring contacts by means of a conductor 18, only the first portion of which is shown in FIG. 1. The current conductor may for instance be guided along one of the struts 11 and further along one of the captivating stays 13. It may also be possible to design one of the struts 11 and one of the captivating stays 13 to act as a current conductor. At ground level the current may be supplied to a consumer station. FIG. 3 shows a second embodiment of a wind-driven power plant according to the invention. In this embodiment the suspension body has an elongate drop-shaped configuration similar to that of an airship. The suspension body may be constructed from a rigid skeleton structure enclosing a number of gas-filled chambers. The suspension body has circular cross-sectional shape. At each of the front and rear portions of the suspension body there is provided a coaxial rotor pair having each two coaxial and coplanar, counterrotating rotors. In each of these rotor pairs the gyroscopic effect is compensated. Both rotor pairs are supported by the suspension body in such a manner that their positions rel-ative thereto are non-variable. The rotor pairs drive a current generator, which has not, however, been shown for the sake of clarity. The details of construction may be substantially similar to those described with reference to FIG. 7.

In this embodiment the attitude control of the suspension body and thus the alignment of the rotors relative to the wind direction is accomplished by means of elevators and rudders disposed at the rear portion of the suspension body, such elevators and rudders being adapted to be pivotally adjusted by means of a control device disposed in the interior of the suspension body and not shown for the sake of clarity. At its forward end the suspension body is connected to a (likewise not shown) captivating stay through a universal joint at the upper end thereof. The lower end of the captivating stay is affixed to an (also not shown) anchorage means at ground level. The connection of the forward end of the suspension body to the captivating stay results in that the suspension body is automatically aligned by the wind in the direction thereof. The captivating stay may also be employed for towing the suspension body, and thus the entire wind-driven power plant, from one place to another. To this purpose the lower end of the captivating line will have to be fastened to an appropriately heavy surface vehicle. In this manner a simple and economical transport of the entire wind-driven power plant from one site to another is readyly accomplished. Also in this wind-driven power plant, the generated current may be transmitted to the ground by means of a (not shown) conductor extending along the captivating stay.

Figure 4:
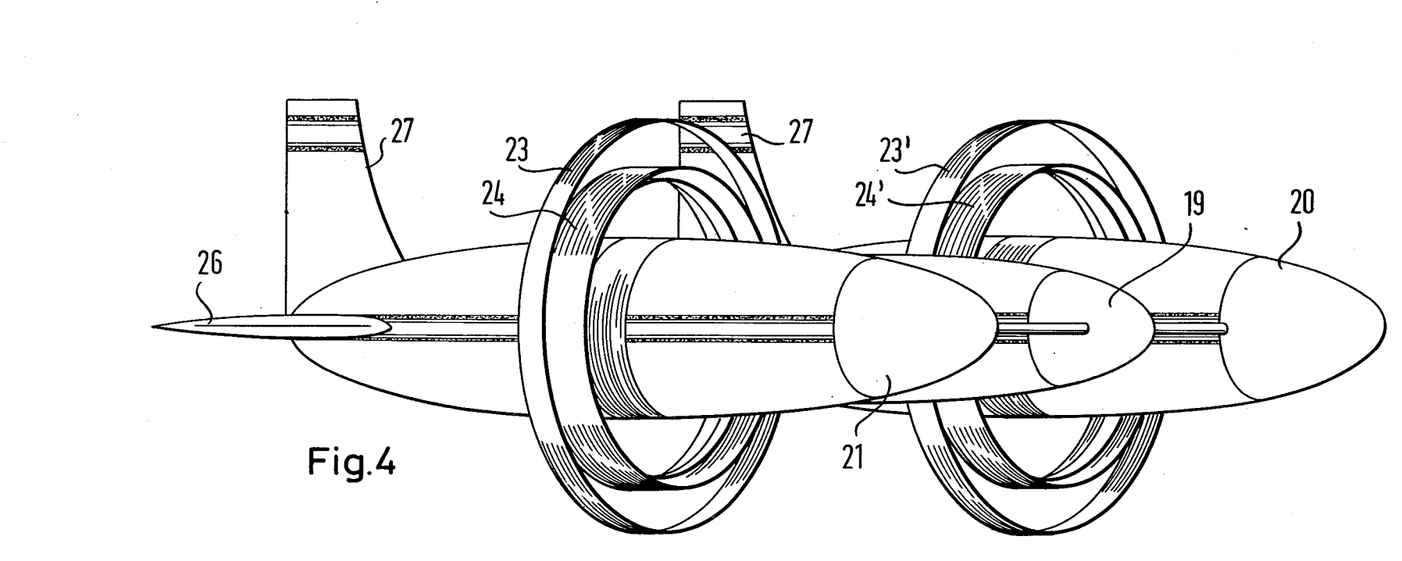
FIG. 4 shows a partially schematic perspective view of a wind-driven power plant according to a third embodiment.
Figure 5:
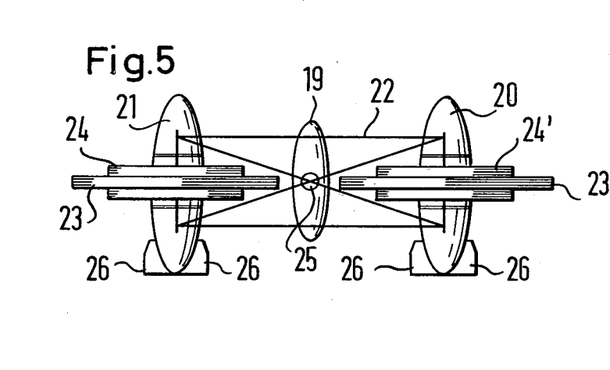
FIG. 5 shows a view of the embodiment of FIG. 4 from below.
Figure 6:
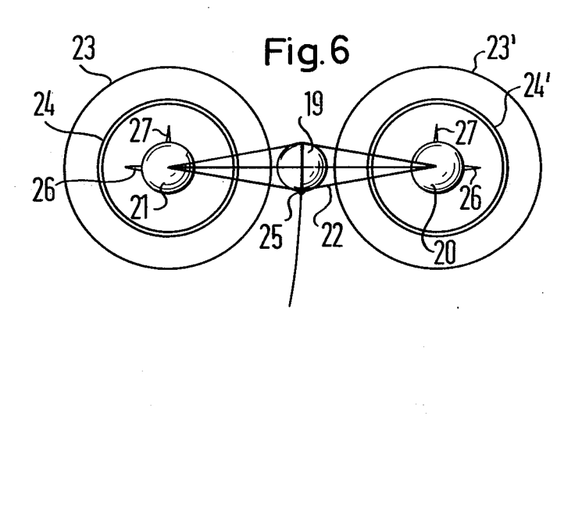
FIG. 6 shows a frontal view of the embodiment of FIG. 4.

FIGS. 4 to 6 show a further embodiment of the wind-driven power plant. This embodiment comprises three suspension bodies 19, 20, and 21, extending parallel to one another and interconnected by means of a skeleton structure 22. Coaxially with each of the suspension bodies 20 and 21, each of said bodies supports a pair of coplanar counterrotating rotors 23, 24, or 23', 24', respectively. The bearing arrangement and construction of the rotor assembly may again be substantially analogous to the details thereof discussed with reference to FIG. 1. In the present embodiment, each of the rotor pairs 23, 24 and 23', 24' drives a separate current generator. The current generated by these generators is conducted to the ground by means of conductors extending along the captivating stay by which the entire wind-driven power plant is anchored at ground level. The captivating stay has it upper end connected to the underside of the wind-driven power plant in proximity to the center of gravity thereof, as indicated at 25 in FIGS. 5 and 6. This connection is accomplished through a universal joint permitting the wind-driven power plant to move in any direction relative to the ground. The attitude control of the wind-driven power plant relative to the wind direction is accomplished by means of elevators 26 and rudders 27 disposed adjacent the rear ends of the suspension bodies 20 and 21 and adapted to be adjusted by means of (not shown) control devices disposed in the interior of said suspension bodies.

Figure 7:
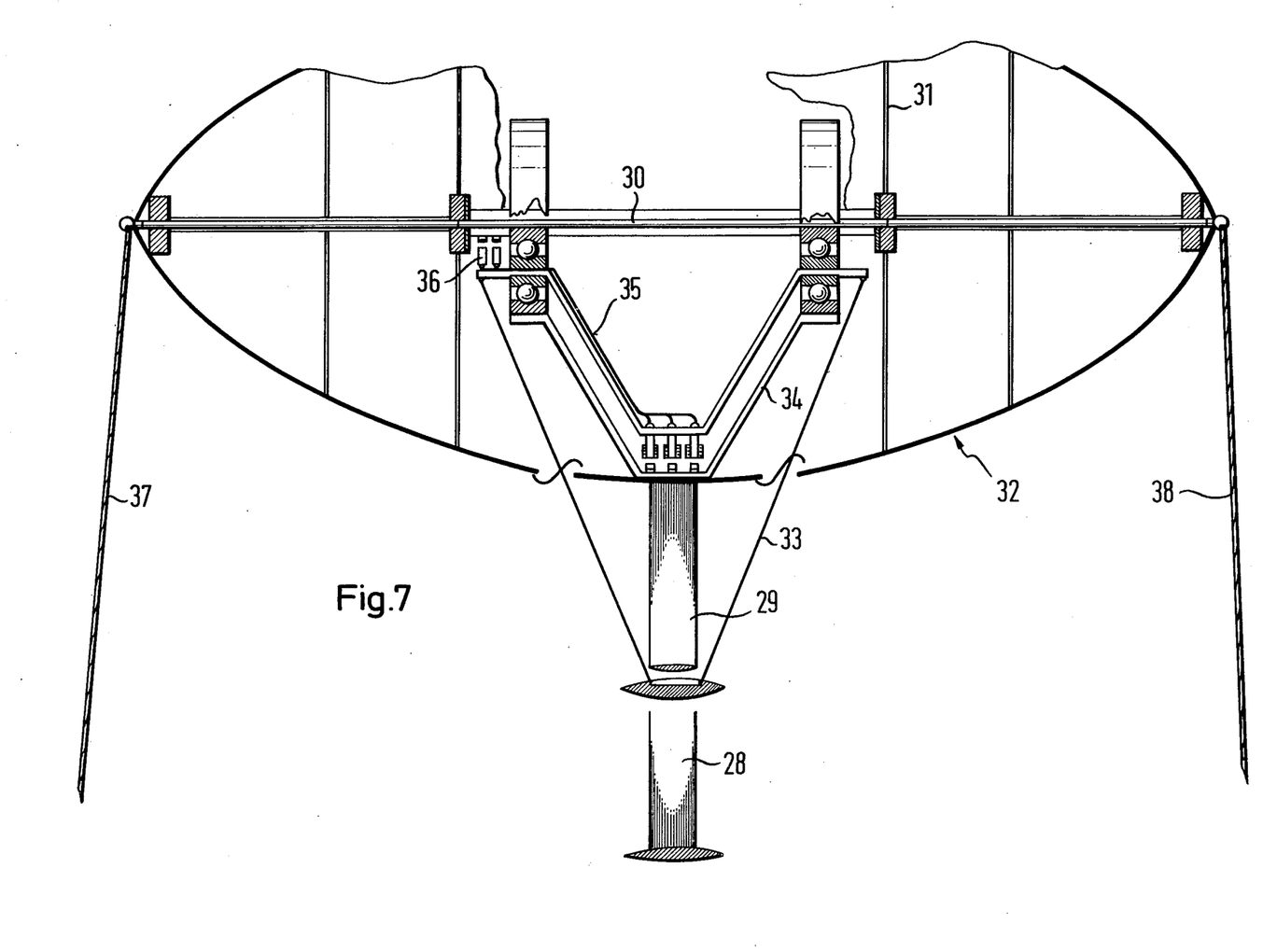
FIG. 7 shows a partially schematic longitudinal section of a wind-driven power plant according to a fourth embodiment of the invention.

FIG. 7 shows a longitudinal sectional view of a further embodiment of a wind-driven power plant. This power plant also comprises two coaxial and coplanar counterrotating rotors 28, 29 supported by a common shaft 30. The shaft 30 has its ends affixed to a skeleton structure 31 of an elongate suspension body 32 having circular cross-sectional shape. In this embodiment the annular blade assemblies of the rotors 28 and 29 are connected to bearings surrounding the shaft 30 by means of struts 33 and 34, respectively, extending at both sides of the main rotor plane. The bearing sleeves of the outer rotor 28 are interconnected to form a rotary body carrying along its outer periphery a plurality of poles provided with electric conductor windings thereon. Opposite these poles the inner rotor 29 has a plurality of permanent magnet poles disposed along its inner periphery. On rotation of the rotors 28 and 29 the poles connected to the respective rotors move along circular paths in opposite directions, so that the rotors 28 and 29 constitute the relatively rotatable parts of a current generator. The current generated in this manner may be fed to a consumer system at ground level through schematically shown conductors 35, slip contacts 36 and (not shown) conductors extending along a captivating stay of the apparatus to the ground.

As shown in FIG. 7, the suspension body 32 of this embodiment of the wind-driven power plant has a captivating stay 37, 38 attached to each of its forward and rear ends, respectively. These captivating stays serve to maintain the suspension body 32, which contains a plurality of gas-filled cavities, at a determined position above the ground. An alignment relative to the prevailing wind direction is possible only within rather narrow limits or by readjusting the anchorage means at ground level. On the other hand, this embodiment of the wind-driven power plant has an extremely simple construction and is particularly suited for employ in an area with substantially constant wind direction.

Figure 8:
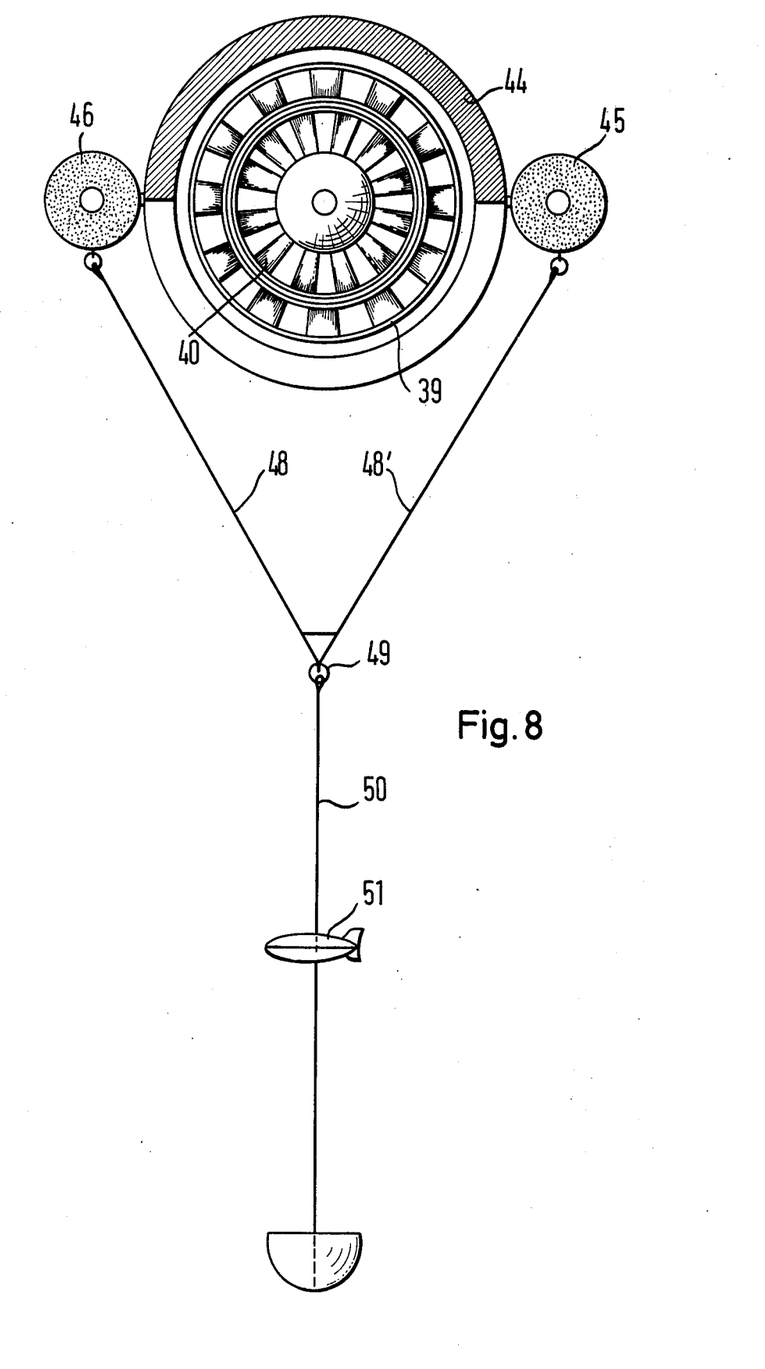
FIG. 8 shows a partially sectioned frontal view of a wind-driven power plant according to a fifth embodiment of the invention
Figure 9:
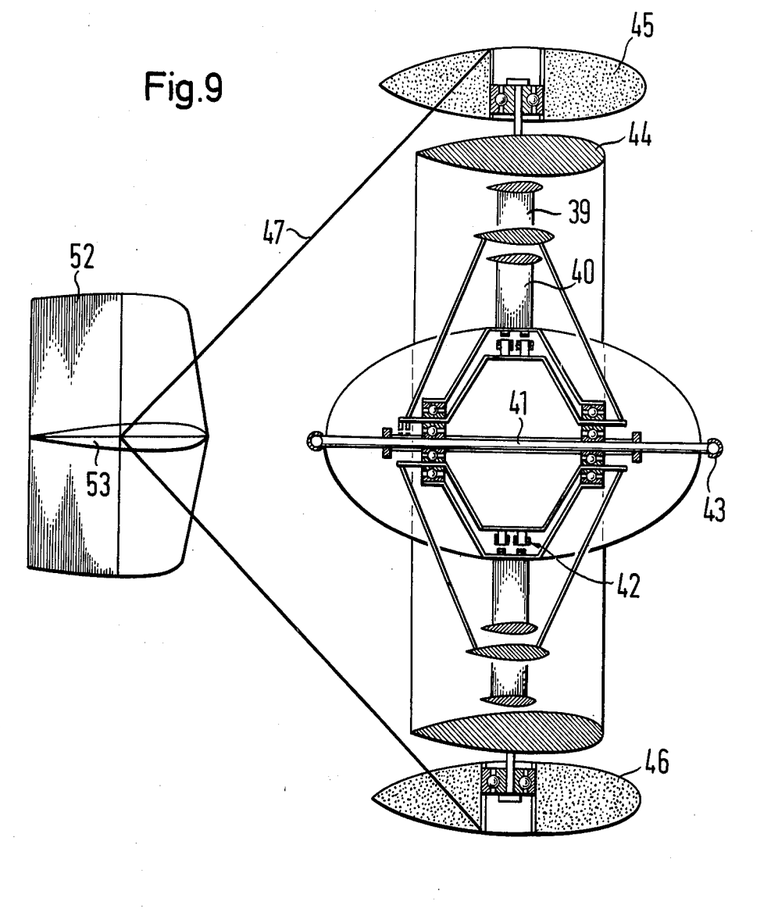
FIG. 9 shows a plan view, partially in horizontal section, of the embodiment of FIG. 8.
Figure 10:
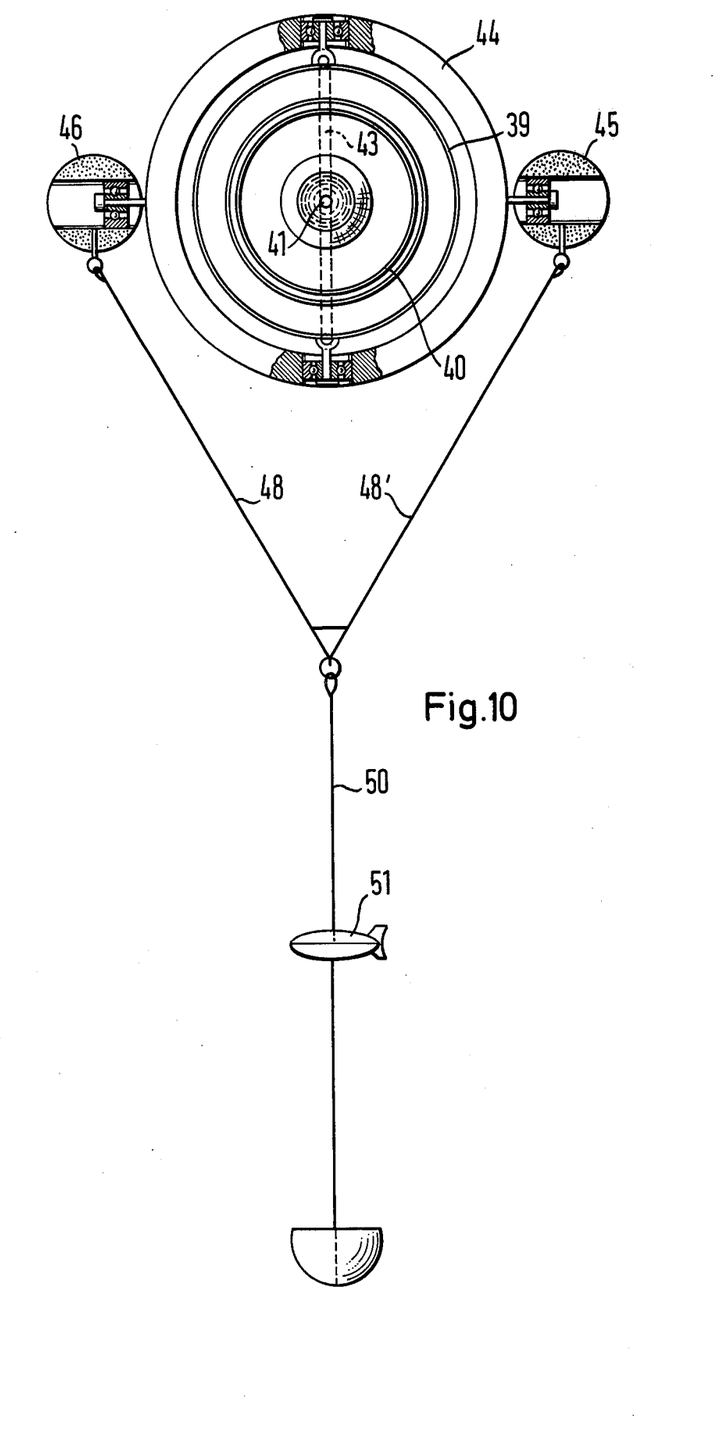
FIG. 10 shows a cross-sectional view of the embodiment of FIG. 8.

A further embodiment of the wind-driven power plant is shown in FIGS. 8 to 10. As particularly shown in the sectional view of FIG. 9, a pair of coaxial and coplanar counterrotating rotors 39 and 40 is rotatably supported about a common shaft 41. The rotors carry magnet poles and form the counterrotating parts of a current generator 42. Otherwise the structural details of the rotor assembly and the current generator are analogous to those described with reference to FIG. 7, so that this description may be related to. As evident from FIGS. 9 and 10, the shaft 41 has its forward and rear ends supported in a ring 43, this ring in turn being supported for rotation about an axis extending vertically to shaft 41 in a ring 44 by means of axle studs projecting therefrom at diametrally opposite points. The ring 44 in turn is supported at diametrally opposite points by means of axle studs engaging two suspension bodies 45 and 46 for rotation about an axis extending vertically to shaft 41 and to the pivotal axis of the ring 43. The two suspension bodies 45 and 46 are rigidly interconnected by means of a skeleton structure 47. From the foregoing it will be understood that in this embodiment the rotors 39 and 40 are gimbal-mounted to be pivotable about three axes extending vertically to one another relative to the suspension bodies 45 and 46.

In this embodiment the ring 44 may be designed as a suspension body in addition to suspension bodies 45 and 46, such that it does not only contribute to air flow guidance but also increases the aerostatic lift of the wind-driven power plant.

As evident from FIG. 8, the suspension bodies 45 and 46 at their undersides are connected to first captivating stays 48 and 48′, the lower ends of which are connected to one another at a joint 49. The joint 49 in turn has attached thereto the upper end of a second captivating stay 50, the lower end of which is connected to an anchorage means such as the anchorage weight shown in FIG. 1. For compensating the weight of the captivating stay 50, the stay itself has attached thereto an additional suspension body 51.

The rear end of the skeleton structure 47 carries control means comprising elevators 52 and rudders 53 adapted to be adjusted by a (not shown) control device for aligning the suspension bodies in a determined attitude relative to the wind. Because of the triaxial gimbal-mounting of the rotor pair 39, 40 to the suspension bodies it is possible in this wind-driven power plant to additionally adjust the rotor system independently of the suspension bodies. This may be accomplished for instance by electric adjusting motors acting on the various axes of the rotor support so as to enable the rotors to be finely adjusted to the wind direction.

In this embodiment also the generated current is transmitted to ground level through branch conductors and slip contacts, it being provided that the current conductors again may extend along the captivating stays. For the sake of clarity, the branch conductors, the slip contacts and the adjusting motors as well as the control devices disposed within the suspension bodies are not shown in the drawing.

Figure 11:
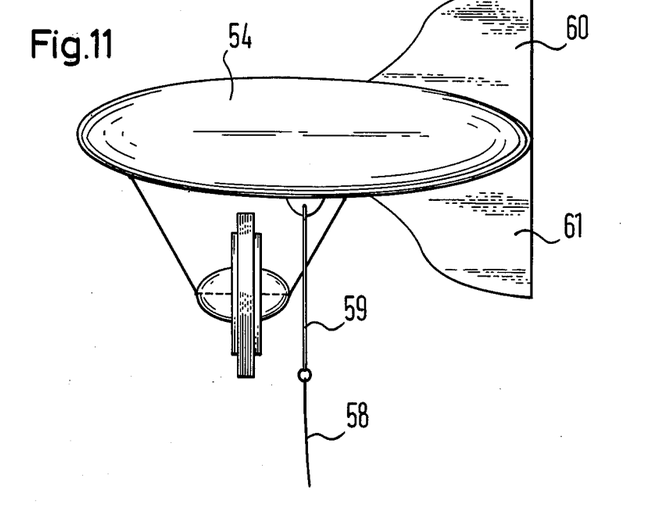
FIG. 11 shows an elevational side view of a wind-driven power plant according to a sixth embodiment of the invention.
Figure 12:
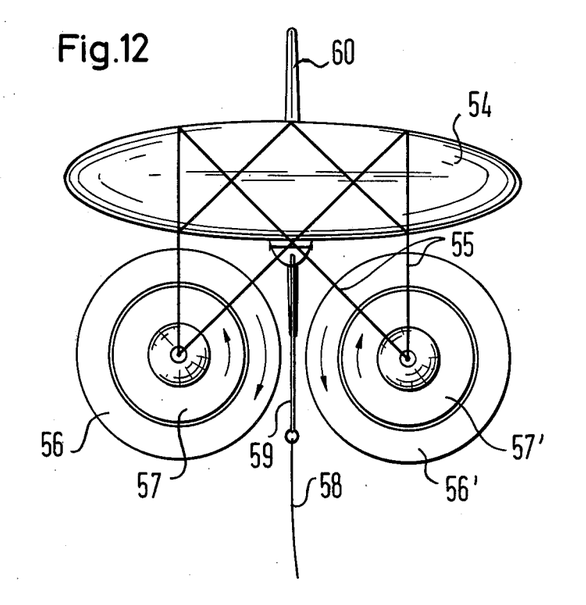
FIG. 12 shows a partially sectioned frontal view of the embodiment of FIG. 11.
Figure 13:
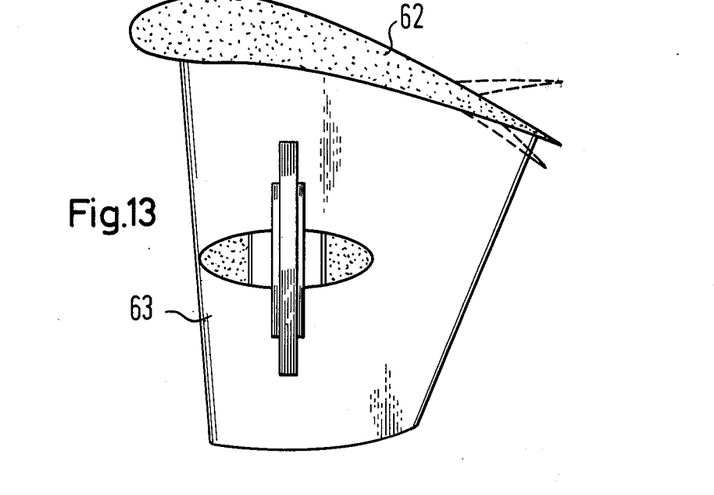
FIG. 13 shows a longitudinal sectional view of a wind-driven power plant according to a seventh embodiment of the invention.
Figure 14:
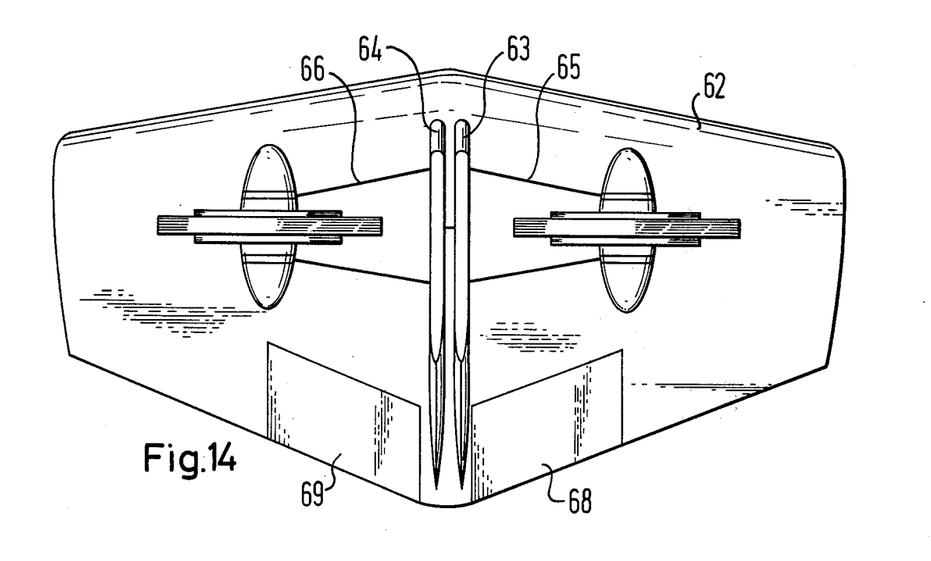
FIG. 14 shows a view of the embodiment of FIG. 13 from below.
Figure 15:
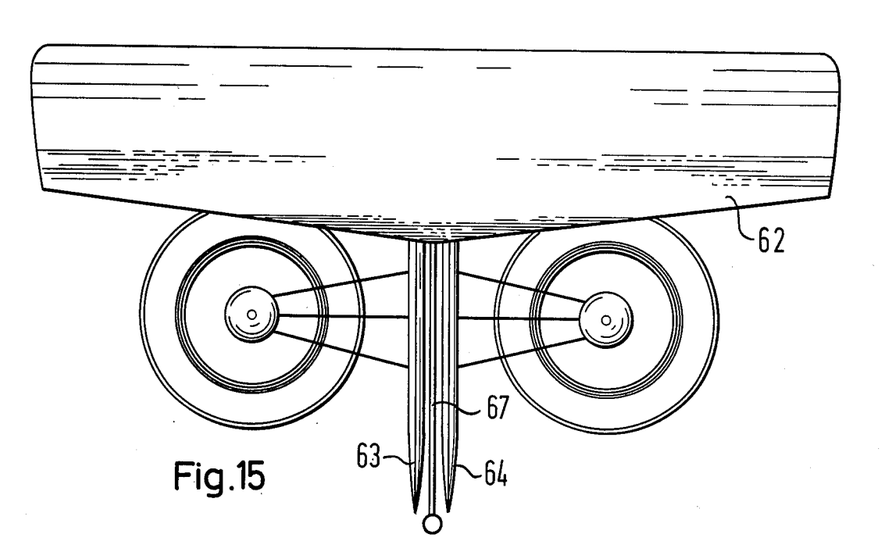
FIG. 15 shows a rear view of the embodiment of FIG. 13.
Figure 16:
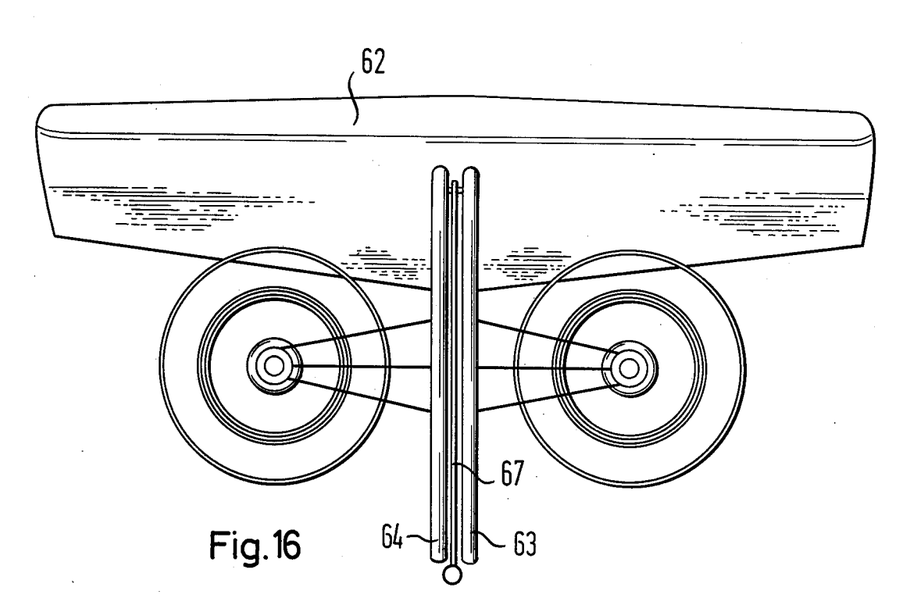
FIG. 16 shows a frontal view of the embodiment of FIG. 13.

FIGS. 11 and 12 show an elevational side view and a frontal view, respectively, of an embodiment of the wind-driven power plant, wherein a disc-shaped suspension body 54 carries in a strut skeleton 55 affixed to its underside two rotor pairs consisting each of two counterrotating coplanar rotors 56, 57 and 56′, 57′, respectively. The rotor pairs may be constructed in accordance either with the structure shown in FIG. 1 or with that shown in FIG. 7.

The suspension body 54 may be constructed as a skeleton structure including a plurality of gas-filled chambers has its underside connected to a captivating stay 58 through a connecting link 59 at a point below its center of gravity. As viewed in the direction of air flow, the rotor pairs are disposed forwardly of the connection point. Again as viewed in the direction of flow, rudders 60 and 61, respectively, are disposed rearwardly of the connection point. The rudders are designed as stationary control surfaces impinged on by the wind to align the suspension body and thus the rotor pairs affixed thereto in the wind direction. The disc-shaped configuration of the suspension body 54 results in an aerodynamic lift caused by the air flow in addition to the aerostatic lift.

The current generated by the rotor pairs is conducted to ground level in the previously discussed manner via not shown conductor systems. It is for instance also possible, however, to provide within the suspension body 54 itself current-consuming apparatus, e.g. transmitting apparatus consuming the current generated by the rotors and the current generators associated therewith.

FIGS. 13 to 16 show a wind-driven power plant provided with a suspension body 62 designed as an aerodynamic wing or airfoil. In longitudinal section this suspension body 62 has an airfoil profile. As viewed from above, the suspension body 62 has a symmetric configuration about its longitudinal axis. Adjacent the longitudinal center of its underside, the suspension body 62 carries downwardly projecting carrier structures 63 and 64 supporting two rotor pairs with counterrotating coplanar rotors through struts 65 and 66, respectively. The construction and operation of the rotors may again correspond to those of the embodiments shown in FIG. 1 or FIG. 7, so that the respective descriptions may be referred to. Intermediate the carrier structures 63 and 64 the underside of the suspension body 62 has connected thereto a pivotable connecting link 67 the lower end of which is in turn pivotally connected to a (not shown) captivating stay attached to an anchorage means at ground level. Adjacent its rear edge the suspension body 62 is provided with control flaps 68 and 69 at both sides of its longitudinal center, said control flaps functioning to adjust the attitude of the suspension body 62, and thus also of the rotor pairs, about its lateral and longitudinal axes. In this wind-driven power plant the suspension body 62 acts not only as an aerostatic suspension body but also in the manner of a captive kite employing the air flow to produce an aerodynamic lift. The rotors may be aligned in the wind direction by suitably controlling the control flaps 68 and 69. The current produced by the rotors is again conducted to ground level by means of (not shown) current conductors.

Figure 17:
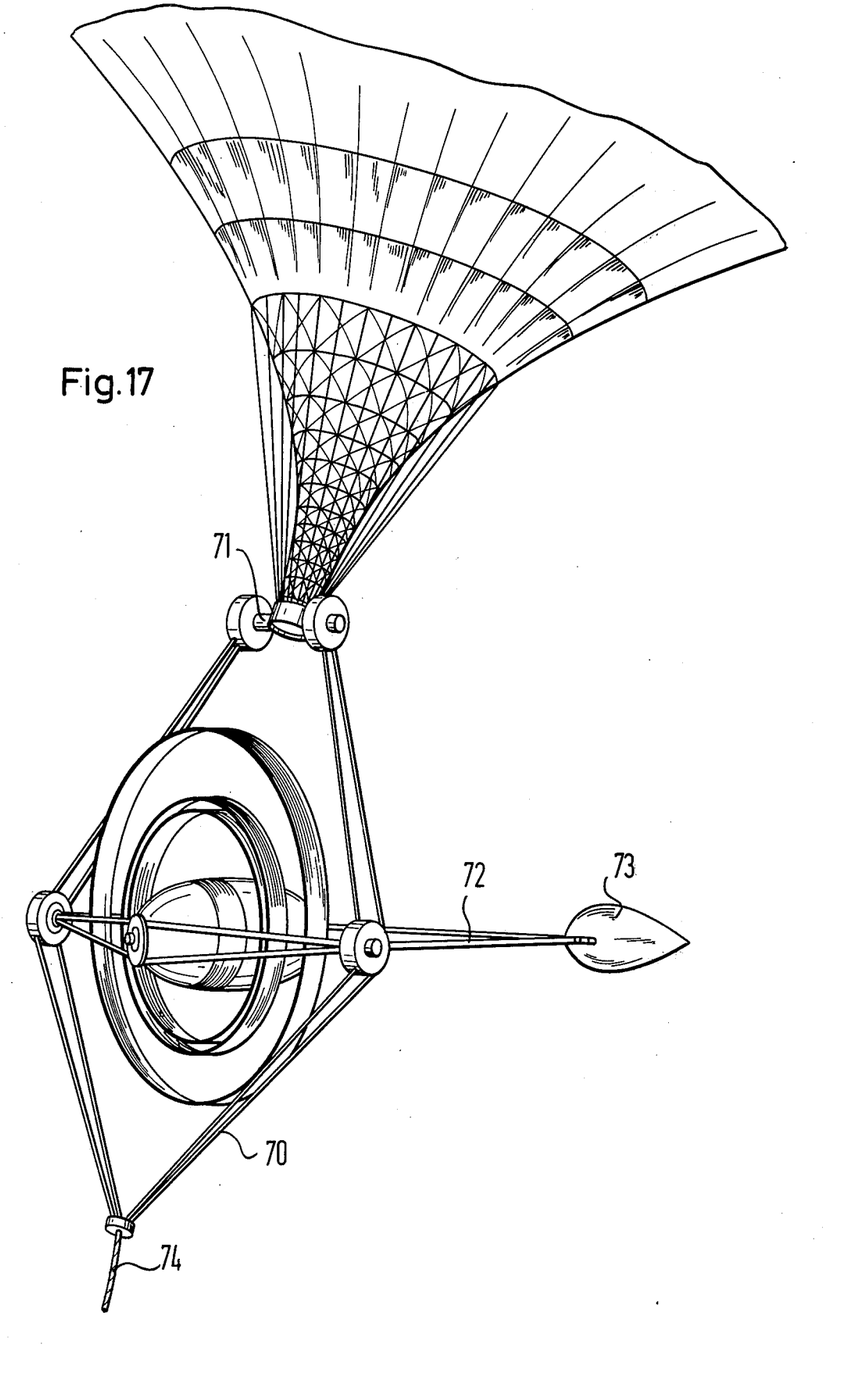
FIG. 17 shows a schematic perspective view of a wind-driven power plant according to an eighth embodiment of the invention.

FIG. 17 shows a schematic representation of an embodiment of a wind-driven power plant, wherein the suspension body is designed as a simple balloon supporting a rotor assembly in a frame 70 mounted to the balloon for pivotal movement about a horizontal lateral axis 71. The rotor assembly consists of two coaxial counterrotating rotors mounted on a carrier frame 72, which is in turn mounted in the frame 70 for pivotal movement about a horizontal axis. The carrier frame 72 is rearwardly extended, with its rear end carrying an aerostatic suspension body 73 functioning to keep the carrier frame 72, and thus the rotors, at a predetermined attitude independent of the position of the frame 70. The frame 70 has its lower end pivotally connected to a captivating stay 74 which is in turn attached to an anchorage means at ground level. In this wind-driven power plant the rotors may be constructed analogous to those described with reference to the foregoing embodiments, or they may be designed as tangential-flow vane-type impellers or possibly also as Flettner rotors.

Figure 18:
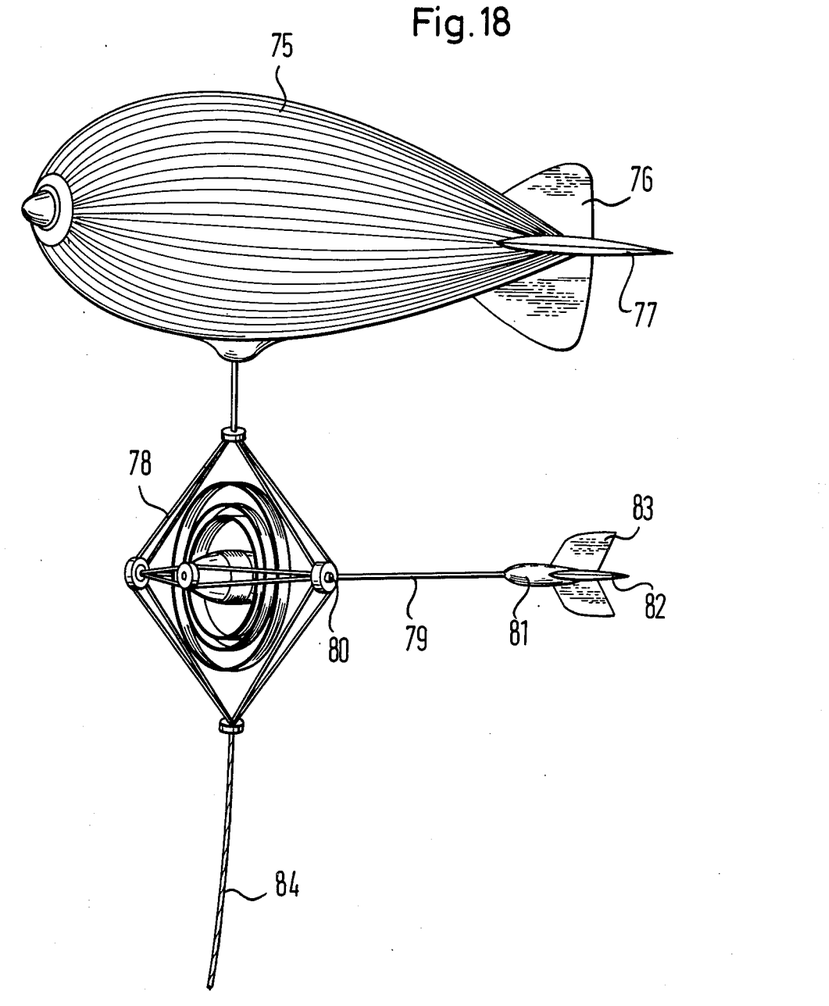
FIG. 18 shows a schematic perspective view of a wind-driven power plant according to a ninth embodiment of the invention.

FIG. 18 schematically shows a further embodiment, wherein an elongate suspension body 75 is provided at its rear end with horizontal and vertical control surfaces 76 and 77, respectively, by means of which it is aligned in the wind direction. At its lower portion the suspension body 75 carries a triaxial universal joint, to which a carrier frame 78 is pivotally connected. This carrier frame 78 supports another frame 79 for pivotal movement about a horizontal axis 80. The frame 79 rotatably mounts a rotor pair for pivotal movement about the horizontal axis 80 together with frame 79. Affixed to the rear end of the frame 79 is an aerostat body 81 for ensuring a predetermined attitude of the frame 79, and thus of the rotor pair, independent of that of the carrier frame 78.

The rear end of frame 79 is additionally provided with horizontal and vertical control surfaces 82 and 83, respectively, for aligning the rotor pair in the wind direction independently of the attitude of the suspension body 75. The carrier frame 78 has its lower end pivotally connected to a captivating stay 84, and through this stay to an anchorage means at ground level. In this embodiment the adjustment of the rotors with respect to the wind direction is thus accomplished independently of the attitude of the suspension body 75.

The invention is not limited to the embodiments described above. It is for instance also possible to design the suspension bodies inn the shape of mushroom-heads or spheres. Instead of the rotor constructions shown in detail it is also possible to employ tangential-flow vane-type impellers or Flettner rotors operating on the Magnus principle.

What is claimed is:

1. A wind-driven power plant comprising current generator, a rotor assembly comprising at least one pair of coaxially and coplanarly mounted counter-rotating rotors having their moments of momentum compensated, at least one rotor being coupled to said current generator, a support means supporting said rotor assembly and current generator, means for aligning said rotor assembly in the wind direction, at least one captivating stay and an anchorage means, said support means comprising at least one aerostatic suspension body carrying its own weight as well as the weight of the rotor assembly, current generator, and alignment means and said suspension body being connected through said captivating stay to said anchorage means.

2. The wind-driven power plant according to claim 1, including a universal joint wherein said suspension body is coupled to said captivating stay through said joint.

3. The wind-driven power plant according to claim 1, wherein said suspension body is retained at its position by a plurality of captivating stays.

4. The wind-driven power plant according to claim 1, wherein said alignment means is associated with said suspension body to align and retain it in a predetermined attitude.

5. The wind-driven power plant according to claim 1, wherein said rotors are mounted at a fixed position relative to said suspension body.

6. The wind-driven power plant according to claim 1, wherein said rotors are mounted in fixed positions relative to one another and gimbal-mounted, at a variable position relative to said suspension body.

7. The wind-driven power plant according to claim 6, wherein said rotors are coupled with said alignment means for their alignment in the wind direction and for retaining them at a desired attitude.

8. The wind-driven power plant according to claim 1, wherein said suspension body is designed as a hub body disposed coaxially with said rotors.

9. The wind-driven power plant according to claim 1, wherein said suspension body is designed as an annular jacket concentrically surrounding said rotors.

10. The wind-driven power plant according to claim 1, wherein said suspension body is designed as an aerodynamic wing.

11. The wind-driven power plant according to claim 1, wherein a plurality of suspension bodies are interconnected to form, in combination, said support means.

* * * * *